3,353,994
NOVEL RETICULATED PRODUCTS
Robert E. Welsh, Claymont, Del., and Albert L. McConnell, Chester, Pa., assignors to Scott Paper Company, Philadelphia, Pa. a corporation of Pennsylvania
No Drawing. Filed May 7 1964, Ser. No. 365,793
15 Claims. (Cl. 117—221)

This invention relates to a new reticulated foam structure, more particularly, this invention relates to a novel reticulated structure made from a membrane-free foam and inorganic particulate materials such as graphite, metal powders, metal alloy powders, oxides of various kinds, as well as higher melting organic polymers such as Teflons, nylon, etc.

Prior art reticulated foam structures have commonly been made from polyurethanes such as polyether polyurethanes and polyester polyurethanes, and vinyl monomers and copolymers such as vinylchlorides and vinylacetates and mixtures thereof. One of the prior art methods for preparing reticulated polyurethanes has been described in Ser. No. 655,368, filed Apr. 26, 1957, now abandoned, and in U.S. Patent No. 3,171,820. Another has been described in Ser. No. 324,578, filed Nov. 18, 1963, now abandoned, and in U.S. Patent No. 3,175,025, wherein an explosive mixture of a combustible gas and oxygen are used to dewindow the diaphanous membranes of the foam structures.

Other methods for dewindowing foam bodies are known but they are of less significance or they generally require more steps or involve use of chemicals which lend themselves poorly to desirable process control.

Previous attempts to produce reticulated structures having covered surfaces have been unsuccessful because conventional coating techniques have resulted in poor attachment of the inorganic materials. In using aluminum powder or leaf, especially troublesome problems have been encountered as the bond between the aluminum and the adhesive used has been very poor. Similarly, the limited numbers of adhesives which are compatible with the powder and the foam structure in attaching the particulate materials to the strands have resulted in a very limited application of the polyurethane structures covered with particulate mineral or metal powders. Further, to achieve adhesion of non-fusible finely divided particles, it has been necessary to employ a binder of some type which generally changes the nature of the surface obtained. Still further, limited coating techniques have tended to give non-uniform distribution of the adhesive such as pooling and collecting of the solution at strand nexae because of surface tension. Thus, in the present process, the elimination of the surface tension problems has resulted in a more evenly-distributed material on the foam surface.

It has now been found that foam bodies reticulated or unreticulated (when open-celled) may be effectively made into novel articles of manufacture possessing properties heretofore unachieved by the present methods.

More particularly, it has now been found that to the strand network of polymeric organic foams may be intimately and tenaciously attached inorganic particulate materials or successive deposits of inorganic particulate materials, either of the same inorganic nature or of diverse inorganic nature, resulting, in effect, in a structure having characteristics of both—an organic polymer and the particulate material(s) attached. Moreover, no adhesive is needed to attach the particulate mattter to the strand. Various materials such as polyolefins may be used to coat the foam substrate and then attach the particulate material; thus the present process is equally applicable to coated as well as uncoated foams.

The polymeric substrate foams capable of being reticulated or which are already reticulated are wtihin the purview of the invention. Representative foams are polyurethanes, classified according to the resin system such as polyether, polyester, polycarbonate, castor oil, etc., (polyester polyurethane and polyether polyurethane foams are preferred); polyvinyl foams such as polyvinyl chloride, polyvinyl acetate, polyvinyl foams of different copolymers; and polyethylene covered polyurethane foams. Foams with pore sizes of from 5 to 80 p.p.i. (pores per linear inch) are useful; of from 5 to 45 p.p.i. are preferred.

As the particulate material, except for those which readily decompose when exposed to the high flame front, inorganic material such as all available powders are within the scope of this invention. Representative powders or particulate materials are obtained from materials such as iron, bronze, aluminum, copper, nickel, platinum, titanium, berylium, and others too numerous to mention. Similarly, mixtures of these powders are within the scope of this invention, especially since many mixtures are useful in catalytic-contacting application. The novel structures include those where the deposits are made from mixtures of nickel and platinum, complexes of titanium and vanadium, etc. Other particulate materials are graphite, titanium oxide, alumina, kieselguhr, asbestos, glass and various types of particulate mineral materials consisting of silicone oxides or silicaseous base materials. Still other materials useful to produce the novel articles of manufacture are particulate or pulverized, organic polymers having melting points above the melting point of the polyurethane structure, e.g. nylon, Teflon, Kel-F and the higher melting polymers of 1-olefins such as 1-butenes.

In general pulverulent materials not susceptible to the decomposition of the flame front because of the high temperature of the flame front are useful in this process. However, it has been found that other methods such as fusion at elevated temperatures afford better means of attaching and dispersing those organic materials having lower melting points than polyurethane. Consequently, the thus produced structures may serve as substrates in the instant process.

Generally, particle size of the particulate material depends on the pore size of the foam material and the strand thickness. Particles up to the thickness of the foam strands may be used. Best results are obtained if particle size is below about half the thickness of the foam strands of the particular foam used. Particle sizes of from about ¼ to about ¹⁄₁₀₀ of the strand thickness are generally used. Smaller particles may also be used and are often desired in catalyst applications. It has been found that very fine powders can equally well be used in the novel process.

The present invention has been accomplished by a method temporarily attaching a powdered mineral or organic polymer to the strands and nexae of a reticulated polymeric foam material, subjecting said covered foam material to an explosive flame front and recovering a fused article of manufacture having heretofore unachieved properties.

Still further, the invention is accomplished by the process comprising the following steps: (a) covering the strands and nexae of an organic polymeric foam material with an inorganic particulate material; (b) permeating said reticulated foam material with an explodable fuel gas and a gas-containing explosion-sustaining amount of oxygen; (c) initiating an explosive flame propagation throughout the foam body, (d) subjecting again the foam to the treatment steps of (a) (b) and (c) to deposit in a tenacious manner additional amounts of the said particulate material and (e) recovering the novel article of manufacture.

Still further, the invention is accomplished by covering temporarily the strands and nexae of a reticulated polyurethane foam material with a metal powder, permeating the thus covered polyurethane foam material with an explodable gas or liquid in contact with an oxygen-containing gas, initiating an explosive flame propagation throughout the foam body, repeating the above steps to deposit additional amounts of said metal powder or other metal powders or mixtures thereof and recovering said novel article of manufacture.

In practicing the invention, the teaching disclosed in the above-described Ser. No. 324,578 filed Nov. 18, 1963, is incorporated herein for better understanding of the process.

One of the materials especially suitable for the temporary attachment of the particles to the foam structure is water. If the foam is hydrophobic, volatile organic solvents such as ethylalcohol and benzene are useful. However, care should be used that the excess solvent is removed. Merely moistening the surface of the polymeric foam material gives a sufficient temporary adhesion to subject it to explosive reticulation. Additionally, the moisture of the slightly wet foam absorbs some of the excess energy occasionally encountered in the explosion-coating process. Other materials useful for the temporary attachment are those fluids possessing small contact angles with polyurethane materials and the particulate powder.

The products obtained from conductive particulate materials according to the above process are especially suitable for improved thermal emissivity and electrical conductivity.

If various layers of material are deposited, the properties of the foam can be considerably changed. For example, by employing various proportions of catalytically active materials such as platinum, nickel, alumina, kieselguhr treated with platinum, etc., catalytically-active contacting pads are obtained possessing a spectrum of activities. By the same token, other materials such as alumina, silica, charcoal, etc., may be employed to yield novel adsorbents especially suitable for removing impurities from fluid streams. It has also been found that by depositing a material having a desirable conductivity the foam material may be used as an electrostatic filter or as an absorber for high frequency electromagnetic energy.

The following examples are included to illustrate the various facets of the invention. These are to be construed with reference to the above discussion and claims and are not intended to limit the broader scope of this invention.

EXAMPLE 1

A block of adipate polyester polyurethane foam previously reticulated by a high temperature flame front and having about 12 pores per inch and an electrical resistance of about $10^{12}$ to $10^{14}$ ohms/cc. was dusted and thoroughly impregnated with graphite powder. The excess was removed by shaking. The block was then placed in a polyethylene bag, evacuated and filled with a gas mixture composed of 16.7% propane and 83.3% oxygen (by volume). The gas mixture was then detonated by a suitable igniter with an attendant sharp explosion. Examination then showed that each strand was uniformly covered with a tenaciously-adhering layer of graphite which resisted washing. Weight gain of the block amounted to 76% compared to the parent reticulated foam. The product exhibited a resistance of about $20 \times 10^6$ ohms/cc.

EXAMPLE 2

In the same manner as illustrated above, a polyether polyurethane foam previously reticulated by high-temperature flame front is immersed in water and the excess water removed by thorough shaking and squeezing. The polyurethane block is then dusted and impregnated with a nickel powder and excess is removed by shaking. The experiment is then carried out as in Example 1. Examination of the block shows a uniformly covered tenaciously-adhering layer of nickel powder on polyurethane which resists washing.

In the same manner as illustrated above, particulate materials such as titanium dioxide, iron, kieselguhr, alumina, aluminum powder and leaf, and various metal oxides producing especially suitable properties were produced. These products have a tenaciously attaching bond between the particulate material and substrate with the material covering each strand and nexus.

What is claimed is:

1. A process for tenaciously depositing, by means of an explosive flame front, a solid particulate material on a reticulated, organic, polymeric material and comprising the steps of: temporarily attaching, at least once, said particulate material on the strands and nexae of said reticulated material by intimately dispersing said particulate material throughout the organic body subjecting said thus-covered organic material to an explosive flame front, at least once, and recovering a fused article of manufacture.

2. A process for tenaciously depositing a solid, inorganic, particulate material on a reticulated, organic, polymeric foam material comprising the steps of:
   (a) temporarily attaching said particulate material on the strands and nexae of said organic, polymeric material;
   (b) permeating said reticulated foam material with an explodable gas and a gas-containing explosion-sustaining amount of oxygen;
   (c) initiating an explosive flame propagation throughout the foam body, and;
   (d) recovering the novel article of manufacture.

3. A process for tenaciously depositing, at least once, a soid, inorganic, particulate material on a reticulated, organic, polymeric material comprising the steps of:
   (a) temporarily attaching said particulate material on the strands and nexae of said organic, polymeric material;
   (b) permeating said reticulated foam material with an explodable liquid having a low boiling point at atmospheric pressure and a gas-containing, explosion-sustaining amount of oxygen;
   (c) evaporating and distributing the vapor of said low-boiling liquid within the foam body;
   (d) initiating an explosive flame propagation throughout the foam body, and;
   (e) recovering the novel article of manufacture.

4. A process for tenaciously depositing at least one layer of at least one species of a solid, particulate material on a reticulated, organic, polymeric foam material comprising the steps of:
   (a) temporarily attaching said particulate material on the strand and nexae surfaces of said organic, polymeric material;
   (b) permeating said reticulated foam material with an explodable gas and a gas-containing, explosion-sustaining amount of oxygen;
   (c) initiating an explosive flame propagation throughout the foam body;
   (d) subjecting again the foam to the treatment steps as in (a), (b) and (c) and;
   (e) recovering the novel article of manufacture.

5. The process according to claim 4 wherein the foam material is polyurethane.

6. The process according to claim 4 wherein the foam material is polyvinylchloride.

7. The process according to claim 4 wherein the foam material is polyethylene.

8. The process according to claim 1 wherein the organic material is polyurethane and the particulate material is at least one metal powder.

9. The process according to claim 1 wherein the particle size of the particulate material is less than ¼ of the thickness of the average organic material strand.

10. The process according to claim 4 wherein the particulate material is a mixture of nickel and iron powder.

11. The process according to claim 1 wherein the particulate material is graphite.

12. The process according to claim 1 wherein the temporary attachment of the particulate material is effected by means of water.

13. The process according to claim 1 wherein the particulate material is titanium dioxide.

14. A reticulated adipate polyester polyurethane foam having of from about 5 to about 60 p.p.i. and an electrical resistance of about $10^{12}$ to $10^{14}$ ohms/cc having a surface deposit of solid graphite and exhibiting a resistance of about $20 \times 10^6$ ohms/cc.

15. The reticulated product according to claim 14 having 12 p.p.i. and a surface deposit of graphite amounting to about 76% compared to the parent reticulated foam.

References Cited

UNITED STATES PATENTS

| | | | |
|---|---|---|---|
| 2,805,274 | 9/1957 | Eisen | 117—31 X |
| 3,171,820 | 3/1965 | Votz | 117—138.8 |
| 3,175,025 | 3/1965 | Geen et al. | 264—321 X |
| 3,175,030 | 3/1965 | Geen | 264—321 |
| 3,297,803 | 1/1967 | Meisel et al. | 264—321 X |

FOREIGN PATENTS

| | | |
|---|---|---|
| 742,387 | 12/1955 | Great Britain. |

ALFRED L. LEAVITT, *Primary Examiner.*

C. K. WEIFFENBACH, *Assistant Examiner.*